Patented May 9, 1939

2,157,525

UNITED STATES PATENT OFFICE 2,157,525

PREPARATION OF CHLORINE MONOXIDE

George H. Cady, Wadsworth, Ohio, assignor to Pittsburgh Plate Glass Company, Allegheny County, Pa., a corporation of Pennsylvania No Drawing. Application June 29, 1938, Serial No. 216,475

19 Claims. (Cl. 23—152)

This invention relates to the production of chlorine monoxide. In my prior application, Serial No. 190,618, I have described and claimed a process of securing chlorine monoxide by contacting chlorine with an alkali metal carbonate or bicarbonate. In accordance with the present invention, I have now found that chlorine monoxide may be produced and, if desired, recovered in gaseous form by contacting an alkaline compound of the alkali metals such as sodium, potassium or lithium hydroxide, carbonate, bicarbonate, phosphate, stannate, aluminate or the oxides of these metals, with a sufficient amount of chlorine.

The reaction appears to be assisted by the presence of water and, in general, it is found preferable to maintain the presence of a small amount of water in order to insure the production of a satisfactory quantity of chlorine monoxide. The presence of water in excess concentrations, however, is undesirable since appreciable evolution of chlorine monoxide is not secured. In order to secure satisfactory yields, it is desirable to treat solid alkali metal compounds of alkaline reaction containing water dispersed throughout the solid. Thus, hydrates of these compounds such as $Na_3PO_4.12H_2O$, $Na_2SiO_3.6H_2O$, etc., when contacted with chlorine, preferably in substantial excess, yield relatively large quantities of chlorine monoxide. Similarly, the monohydrate or decahydrate of sodium carbonate containing approximately 15 and 63 percent, respectively, may be treated with chlorine to convert a substantial portion of the chlorine to chlorine monoxide. In general, it is found preferable to avoid the use of such excess concentrations of water that a substantial portion of the alkali metal compound is dissolved and for this reason it is preferred to treat compositions containing water which are largely in the solid state.

While very concentrated aqueous solutions may be treated in this manner, it is found, in general, that the yields are low and that a substantial portion of the chlorine is consumed in the production of chlorates, and other chlorine compounds.

Since the action of the water is apparently catalytic, very low concentrations or traces thereof, appear to assist the reaction. However, small amounts of water may evaporate during the reaction and since the presence of some water is, in general, required for efficient operation, it is preferred that the amount of water maintained in the compound be sufficient to compensate for loss of water by evaporation. If desired, the evaporated water may be replaced by introduction of steam or water into the reaction zone continuously or from time to time. By one very effective method, I may maintain sufficient moisture within the reaction chamber to prevent substantial increase or decrease in the water content of the alkali metal compound. This may be done in suitable manner as, for example, by periodically or continuously introducing a predetermined amount of steam or water vapor into the reaction zone during chlorination or by bubbling chlorine gas through water, maintained at a given temperature before the chlorine is introduced into the reaction chamber.

In some cases, water is generated during the reaction of the chlorine and the alkali metal compound and, in that event, the addition of further water may be unnecessary for certain purposes. Thus, it is found that a quantity of water is evolved when solid alkali metal bicarbonates or hydroxides which contain water of constitution are contacted with chlorine and, if desired, the presence of further amounts of water may be dispensed with. However, it is found that the yields of chlorine monoxide and percent of chlorine converted into the oxide are frequently increased under similar conditions of chlorination when additional water is present.

The temperature of chlorination is desirably maintained at or near room temperature (approximately 20–30° C.) in order to secure maximum yield although temperature as high as 200° C. may be used under some conditions. When hydrates of the alkali metal compounds are being chlorinated, treatment above about 100° C. does not appear to be desirable due to the rapidity with which certain of these hydrates lose water at this temperature. By maintaining sufficient moisture in the reaction zone, however, it is possible to operate at higher temperatures. Chlorination at temperatures of 0° C. or below also yields successful results.

Chlorine monoxide may be produced in some quantity by subjecting the alkaline alkali metal compounds to the action of chlorine in the substantial absence of water at somewhat increased temperatures. Thus, chlorine monoxide may be secured by treatment of an alkali metal carbonate at a temperature of 150° C. or above.

Agitation or grinding of the alkali compound may assist the reaction by abrading the reacted material from the surface thereof and continually exposing fresh compound surface to the action of the chlorine. This may be done, for example, by suspending the compound in a gaseous or liquid diluent such as air, carbon dioxide, nitrogen, etc., and grinding by suitable means such as a ball or colloid mill.

Usually, I find it desirable to conduct the reaction by countercurrent contact of the chlorine and the alkaline compound, suitable in a tower. In such a case, a gaseous dispersion of an alkaline alkali metal compound, such as sodium hydroxide may be formed in a convenient manner as by showering finely divided caustic from an upper portion of the tower and chlorine is passed through the dispersion by introducing chlorine at a lower portion of the tower and withdrawing the treated gas containing chlorine monoxide from an upper part thereof.

The relative amounts of chlorine and alkali metal compound which are used may be capable of considerable variation. If insufficient chlorine is used, however, no substantial chlorine monoxide appears to be produced and I find it desirable to maintain the chlorine concentration equal to or greater than that required to establish equilibrium in the system chlorine-alkaline alkali metal compound-chlorine monoxide. For such compounds as sodium hydroxide, potassium hydroxide, sodium carbonate, sodium bicarbonate, etc., it is desired to maintain the chlorine concentration substantially in excess of the molecular equivalent of the reacting compound. In contacting the alkali metal compound with chlorine, it has been observed that it is not necessary to completely convert the chlorine into chlorine monoxide and usually I prefer to pass the chlorinating gas through the reaction zone at such a rate that not substantially in excess of 25-35 percent of the chlorine is so converted.

The chlorine is preferably diluted with convenient gaseous or liquid diluents such as air, nitrogen, carbon dioxide, carbon tetrachloride and the like. The presence of such diluents appears to cause an increase in the yield of chlorine monoxide produced from a given amount of chlorine and has the additional function of minimizing the possibility of explosions. Gases containing up to 25 percent chlorine are found to be most suitable. Gases, such as carbon dioxide, which may be evolved during the reaction, may be used as the diluent. By regulating the concentration of chlorine in the gas entering the reaction zone, I may readily control the rate of the reaction.

The treated gas, after removal from the reaction zone, contains substantial quantities of chlorine, chlorine monoxide and gaseous diluents. It may be treated to recover the chlorine monoxide in a convenient manner, for example by treatment with water. I have found that when a gas containing chlorine and chlorine monoxide is contacted with a body of water of suitable magnitude, chlorine monoxide may be absorbed without substantial absorption of chlorine. The use of excess concentrations of water is usually avoided since an undesirable amount of chlorine may be absorbed and a diluted product may be formed. In general, it is found that sufficient water is used to insure the production of a solution of HOCl having a concentration in excess of about 4 percent by weight.

The treatment of the chlorine gases with water may be conducted by any suitable gas-liquid contacting process such as by bubbling the gas obtained from the chlorination of the alkali metal compound through water, or by countercurrently flowing water and the gaseous mixture in convenient apparatus such as a bubble tower. The undissolved gas containing chlorine and the insoluble diluents may then be recycled with or without additional chlorine to produce further quantities of chlorine monoxide. By this means, it is possible to produce aqueous solutions of hypochlorous acid of high concentrations in excess of 4-10 percent while avoiding the presence of chlorine monoxide in explosive concentrations.

Gas, before treatment, is preferably maintained substantially free of solid matter since the presence of alkaline alkali metal compounds appears to promote the formation of chlorate in the acid. Accordingly, it is often desirable to provide a suitable separator for removing solids from the gas prior to contacting the gas with water.

The following examples are illustrative:

*Example I.*—A quantity of pulverized sodium hydroxide containing 0.5 percent by weight of water was countercurrently contacted with a stream of gas containing 25 percent by volume of chlorine and the balance air in the proportion of one part by weight of the sodium hydroxide to 20 parts by weight of chlorine. The gases evolved were removed and found to contain 0.9 percent chlorine monoxide by volume and approximately 90 percent of the chlorine initially introduced. The chlorine monoxide was recovered by passing the gas through water at 0° C. until a solution containing 100 grams of HOCl per liter was produced.

*Example II.*—A quantity of hydrated sodium phosphate ($Na_3PO_4.12H_2O$) containing 57 percent water was countercurrently contacted with a stream of gas containing 25 percent by volume of chlorine and the balance air in the proportion of one part by weight of the $Na_3PO_4.12H_2O$ to 1.80 parts by weight of chlorine. The gases evolved were removed and found to contain 0.98 percent chlorine monoxide by volume and approximately 85 percent of the chlorine initially introduced. The chlorine monoxide was recovered by passing the gas through water at 0° C. until a solution containing 50 grams of HOCl per liter was produced.

*Example III.*—A quantity of sodium carbonate monohydrate containing 14.5 percent water was countercurrently contacted with a stream of gas containing 25 percent by volume of chlorine and the balance carbon dioxide in the proportion of one part by weight of the solid to 14.2 parts by weight of chlorine. The gases evolved were removed and found to contain 1.06 percent chlorine monoxide by volume and approximately 90 percent of the chlorine initially introduced. The chlorine monoxide was recovered by passing the gas through water at 0° C. until a solution containing 150 grams of HOCl per liter was produced.

*Example IV.*—A quantity of hydrated sodium silicate containing 42 percent water and countercurrently contacted with a stream of gas containing 25 percent by volume of chlorine and the balance air in the proportion of 1.2 parts by weight of the sodium silicate to 6.76 parts by weight of chlorine. The gases evolved were removed and found to contain 1.03 percent chlorine monoxide by volume and approximately 85 percent of the chlorine initially introduced. The chlorine monoxide was recovered by passing the gas through water at 0° C. until a solution containing 135 grams of HOCl per liter was produced.

*Example V.*—A quantity of anhydrous sodium carbonate was countercurrently contacted with a stream of gas containing 10 percent chlorine by volume and the balance carbon dioxide by volume in the proportion of one part by weight of solid to 15 parts by weight of chlorine at a temperature of 160° C. The evolved gases contained 0.2 percent chlorine monoxide by volume which was recovered by passing the gaseous mixture through water until a solution containing 100 grams per liter of HOCl was secured.

Although the invention has been described with reference to the specific details of certain embodiments thereof, it is not intended that such details shall be regarded as limitations upon the scope of the invention.

By the term "hydrated" in the claims, I mean to include solid compounds containing water, physically or chemically combined with the solid regardless of whether the product be true hydrate or not. The phrase "in the presence of water" is intended to include water of constitution such as is present in bicarbonates or hydoxides as well as water which is present as such.

I claim:

1. A process of preparing chlorine monoxide which comprises contacting a solid alkaline compound of the alkali metals with sufficient chlorine and at a temperature sufficiently high to cause evolution of a substantial quantity of chlorine monoxide.

2. A process of preparing chlorine monoxide which comprises contacting a solid alkali metal hydroxide with sufficient chlorine to cause evolution of a substantial quantity of chlorine monoxide.

3. A process of preparing chlorine monoxide which comprises contacting solid sodium hydroxide with sufficient chlorine to cause evolution of a substantial quantity of chlorine monoxide.

4. A process of preparing chlorine monoxide which comprises contacting a solid alkaline phosphate of the alkali metals with sufficient chlorine and at a temperature sufficiently high to cause evolution of a substantial quantity of chlorine monoxide.

5. A process of preparing chlorine monoxide which comprises contacting an alkaline compound of the alkali metals with sufficient chlorine in the presence of sufficient water to cause evolution of chlorine monoxide, the amount of water present being insufficient to dissolve a major portion of the chlorine monoxide.

6. The process of claim 5 wherein the compound of the alkali metals is an alkali metal hydroxide.

7. The process of claim 5 wherein the compound of the alkali metal is an alkali metal phosphate.

8. The process of preparing chlorine monoxide which comprises contacting a solid alkaline compound of the alkali metals with chlorine in the presence of a quantity of water insufficient to dissolve a substantial portion of said solid.

9. The process of claim 8 wherein the compound of the alkali metals is an alkali metal hydroxide.

10. The process of claim 8 wherein the compound of the alkali metals is an alkali metal phosphate.

11. The process of claim 8 wherein the alkali metal compound is an alkali metal silicate.

12. A process of preparing chlorine monoxide which comprises contacting a solid hydrated alkaline compound of the alkali metals with chlorine in the presence of a quantity of water insufficient to dissolve a substantial portion of said solid.

13. The process of claim 12 wherein the compound of the alkali metals is an alkali metal hydroxide.

14. A process of preparing chlorine monoxide which comprises contacting a solid alkaline compound of the alkali metals with sufficient chlorine and a diluent at a temperature sufficiently high to cause evolution of chlorine monoxide.

15. The process of claim 14 wherein the compound of the alkali metals is an alkali metal hydroxide.

16. The process of claim 14 wherein the compound of the alkali metals is an alkali metal phosphate.

17. A process of preparing chlorine monoxide which comprises contacting an alkaline compound of the alkali metals with a solution of chlorine in carbon tetrachloride of sufficient chlorine concentration to cause evolution of chlorine monoxide.

18. The process of claim 17 wherein the alkaline compound is an alkali metal hydroxide.

19. A process of preparing chlorine monoxide which comprises contacting a solid alkaline compound of the alkali metals, which contains water of constitution and which is therefore capable of dissociating to liberate a quantity of water, with sufficient chlorine to cause evolution of chlorine monoxide.

GEORGE H. CADY.